S. A. HOLMES.
SEED CORN DRIER.
APPLICATION FILED APR. 1, 1919.
1,325,290. Patented Dec. 16, 1919.
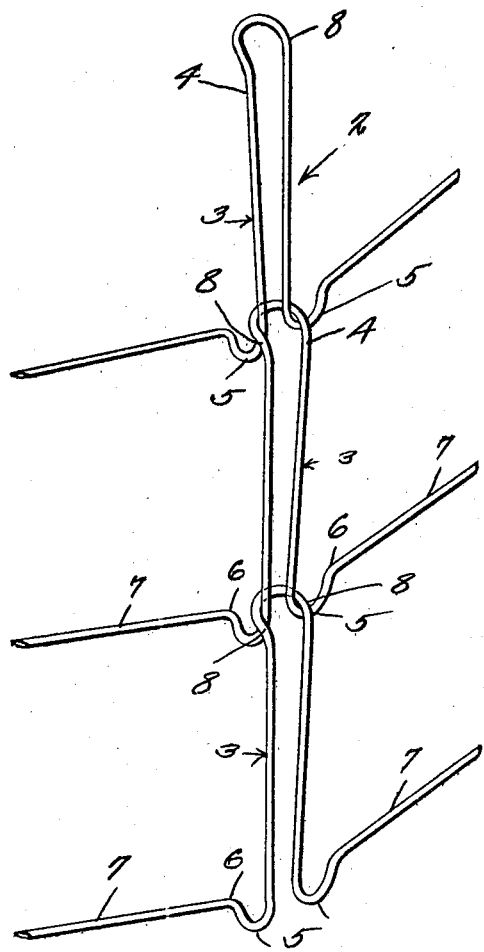
S. A. Holmes, Inventor,
Witness
By C. A. Snow & Co., Attorneys.

UNITED STATES PATENT OFFICE.

SAMUEL A. HOLMES, OF STORM LAKE, IOWA.

SEED-CORN DRIER.

1,325,290.  Specification of Letters Patent.  Patented Dec. 16, 1919.

Application filed April 1, 1919. Serial No. 286,648.

*To all whom it may concern:*

Be it known that I, SAMUEL A. HOLMES, a citizen of the United States, residing at Storm Lake, in the county of Buena Vista and State of Iowa, have invented a new and useful Seed-Corn Drier, of which the following is a specification.

This invention relates to improvements in seed corn driers, the object of the invention being to provide an improved device of this class which will save considerable space in the drying sheds and when not in use can itself be stored in a very small space.

A further object of the invention is to generally improve and strengthen the structure of the device.

With the foregoing and other objects in view, which will appear as the description proceeds, the invention consists in the novel features of construction and combination of parts which will be more fully described hereinafter and particularly pointed out in the claims.

The drawing accompanying and forming part of this specification is a perspective view illustrating a portion of a seed corn drier embodying my invention.

In the corn belt of the United States it is a well known fact that the average farmer is considerably hampered in drying his seed corn by reason of the fact that the devices usually employed for holding the corn themselves occupy so much space that the available space in which to hang the corn is very frequently found to be insufficient. The primary object of the present invention, therefore, is to provide a device in the use of which the space ordinarily occupied can be made to hold a very much larger quantity of corn than heretofore, and at the same time to add strength to the device.

Referring to the drawing, my improved seed corn drier comprises a chain 2 formed of integral link members 3 bent from a piece of wire of suitable size. As shown in the drawing, the wire is bent at the center of its length into an inverted U-shaped portion 4, the end of each leg of which is curved outwardly to form a semicircular portion 5, the wire being then bent at a sharp angle, as at 6, to form a portion or wing 7 extending at an obtuse angle from the semicircular portion 5. It will be understood that the portion 7 is thrust into the center of the ear of corn, whereby each of the links is adapted to carry two ears of corn. For permitting the links to be connected together to form a chain, as shown at 2, the U-shaped portion 4 of each link is bent or offset, as shown at 8, whereby the U-shaped portion of one link may be slipped through the U-shaped portion of the next succeding link and the offset portion 8 will permit the links to hang in a straight chain.

While I have described in detail the structure illustrated herein, it is to be understood that I do not thereby limit my invention to the precise features of construction shown, as I am aware that many mechanical changes may be made without departing from the spirit and scope of the invention as set forth in the appended claims.

Having thus described my invention, what I claim is:

1. A corn drier including a plurality of interlocking link members, each of the link members including parallel legs connected by a loop, said legs terminating in laterally extending arms, and curved semi-circular sections connecting the laterally extending arms to the leg portions for forming a seat for the loop of the adjacent link.

2. A corn drier including a plurality of interlocking link members, each of the link members including parallel leg members laterally extending arms, formed integral with the leg members, and means connecting the leg members and arms for providing a seat for engagement with the loop of the adjacent link member.

In testimony that I claim the foregoing as my own, I have hereto affixed my signature in the presence of two witnesses.

SAMUEL A. HOLMES.

Witnesses:
 BLANCHE WOMAET,
 JAMES DE LAEDE.